July 30, 1940.  A. F. STEIERT  2,209,858
INTERMITTENT MOVEMENT FOR DISPLAY DEVICES
Filed April 21, 1939    4 Sheets-Sheet 1
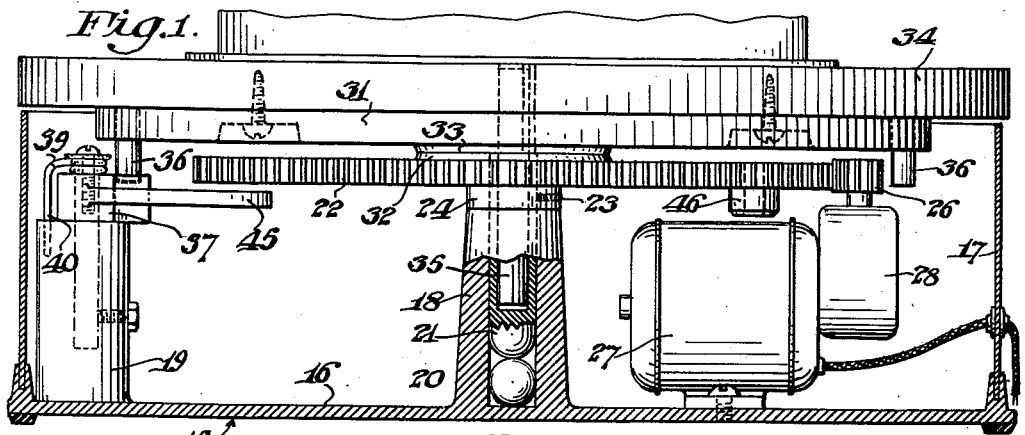
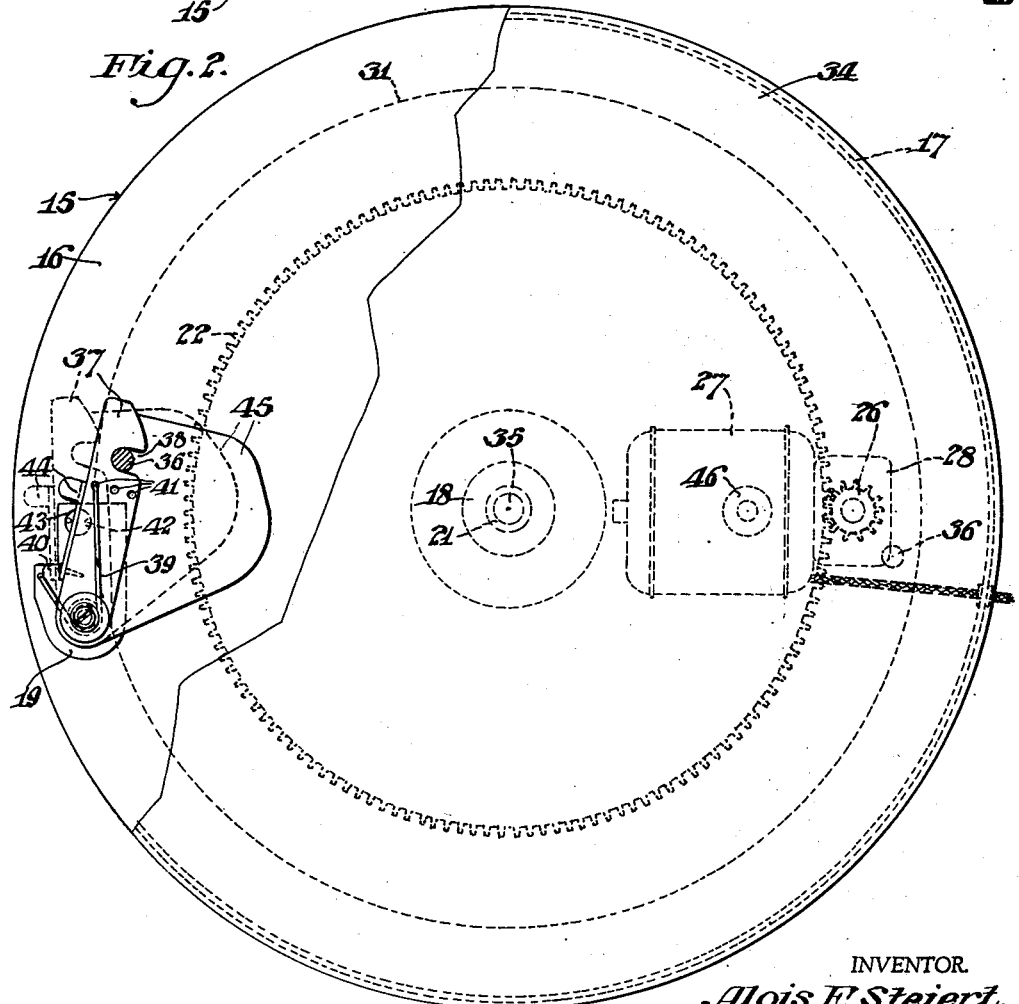
INVENTOR.
Alois F. Steiert,
BY
ATTORNEY.

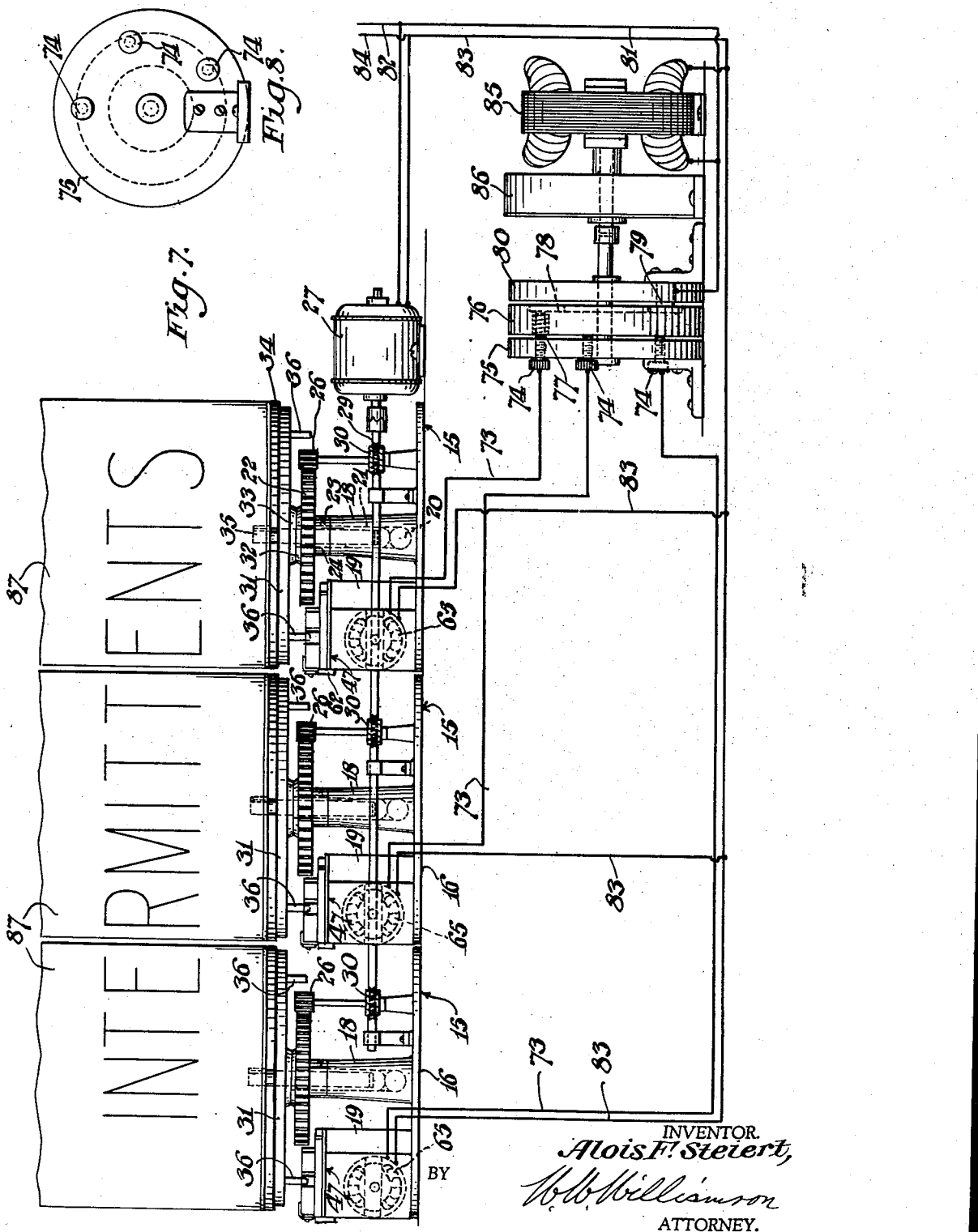

July 30, 1940.   A. F. STEIERT   2,209,858
INTERMITTENT MOVEMENT FOR DISPLAY DEVICES
Filed April 21, 1939   4 Sheets-Sheet 4
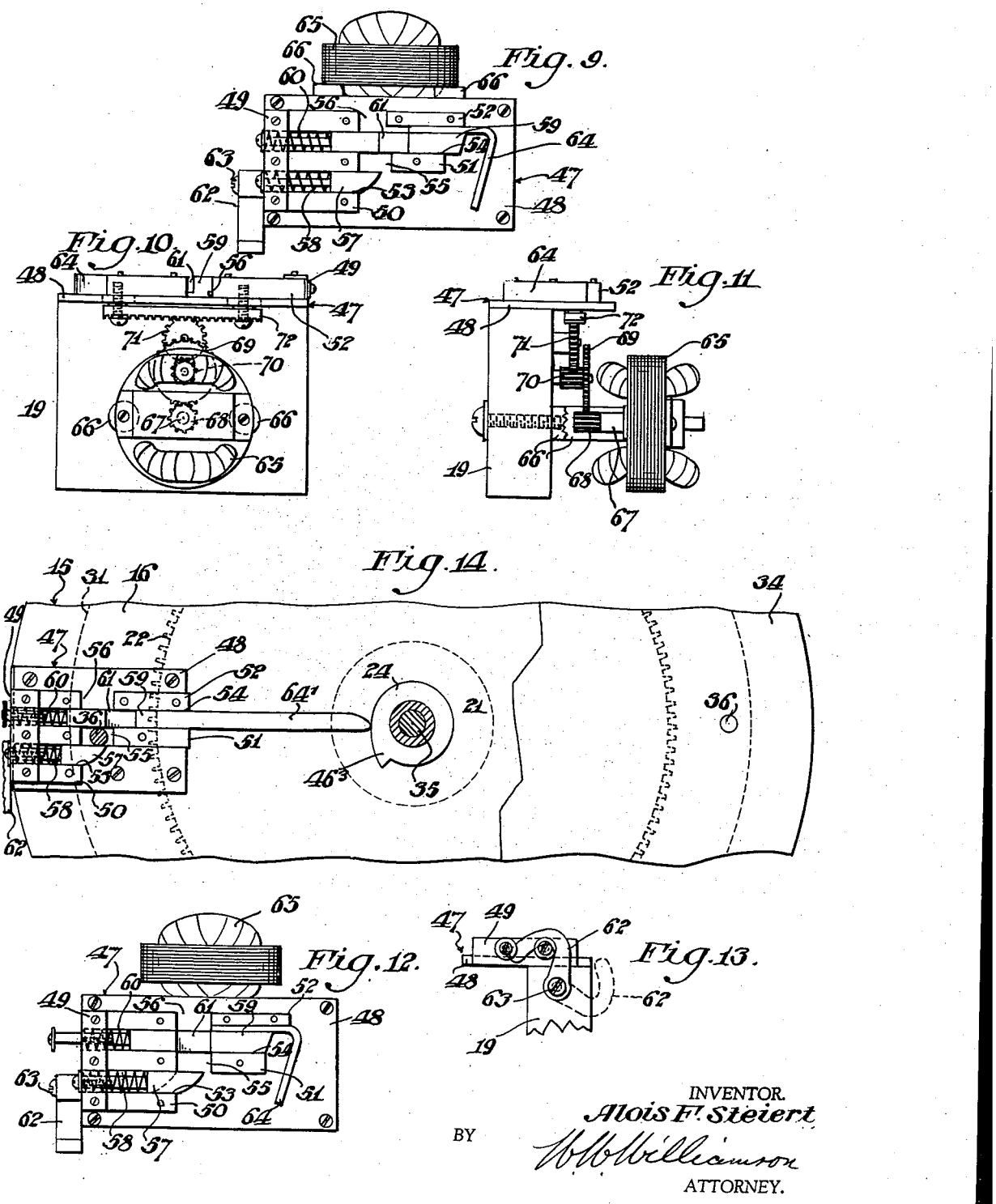
INVENTOR.
Alois F. Steiert
BY
ATTORNEY.

Patented July 30, 1940

2,209,858

UNITED STATES PATENT OFFICE 2,209,858

INTERMITTENT MOVEMENT FOR DISPLAY DEVICES

Alois F. Steiert, Philadelphia, Pa.

Application April 21, 1939, Serial No. 269,177

12 Claims. (Cl. 74—112)

My invention relates to new and useful improvements in an intermittent movement for display devices and aims generally to provide a novel construction which is simple, strong and durable and capable of intermittently moving one or more articles to display several parts thereof, or different articles, at predetermined intervals.

One very essential object of this invention is to provide an arrangement of cooperating parts whereby a rotating or intermittently operated element is positively locked during the intervals it is at rest.

Another object of the invention is to provide a display device that may be inexpensively constructed in numerous pleasing and attractive configurations having a changing display portion to attract the attention of persons in the vicinity, especially those who might pass by a "still" display device.

Another object of the present invention is to provide an intermittent movement for display devices operable either mechanically or electro-mechanically and including a locking means to positively hold an intermittently movable element stationary during the rest periods.

Another object of the invention is to provide an intermittent movement mechanism consisting of a constantly revolving driving member receiving its motion from a prime mover, such as an electric motor, said driving member transmitting motion to a driven member by frictional contact between the two members, and a locking means to receive a stud on the driven member for holding the latter stationary, said locking means to be released by a striker moving with the driving member.

A further object of the invention is to construct a locking means which will release the stud carried by the driven member due to a portion of the locking means being retracted by an electrically operated mechanism, such as a small motor, energized through the medium of make and break timer.

With the above and other objects in view, this invention consists of the details of construction hereinafter set forth and then designated by the claims.

In order that those skilled in the art to which this invention appertains may understand how to make and use the same, I will describe a number of forms embodying the said invention, referring by numerals to the accompanying drawings, in which:

Fig. 1 is a view partly in side elevation and partly in section illustrating one type of the invention.

Fig. 2 is a plan view thereof with portions broken away to show details of construction.

Fig. 7 is a side elevation of a dual arrangement of display devices with the electrical circuits illustrated diagrammatically and showing a slightly different concept of the locking means disclosed in Figs. 5 and 6.

Fig. 8 is a rear view of the make and break timer.

Fig. 9 is a detail top plan view of the electrically operated locking means as shown in Fig. 7.

Fig. 10 is a side elevation thereof.

Fig. 11 is an end view of the same.

Fig. 12 is a view similar to Fig. 9 showing the secondary slide bolt retracted.

Fig. 13 is an enlarged fragmentary end view of the locking means illustrating one manner in which slide bolts may be retained in retracted positions.

Fig. 14 is a plan view of the display device with portions broken away to depict another arrangement of locking means of Figs. 5 and 6.

Figure 3:
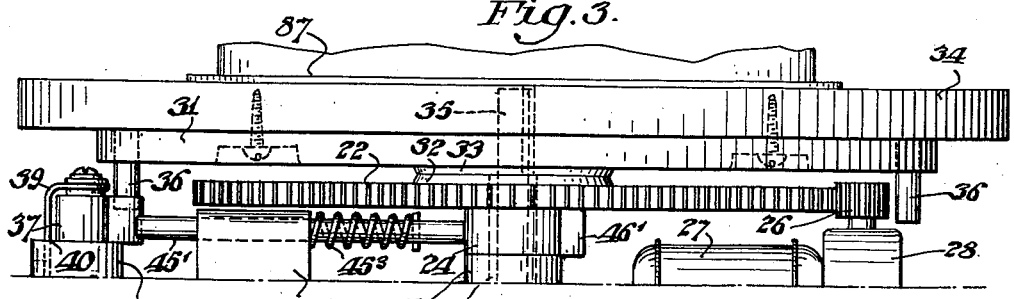
Fig. 3 is a fragmentary side elevation of a modification without the enclosure or housing.

In carrying out my invention as herein embodied 15 represents generally a frame or support and may include a base 16 carrying a casing or enclosing wall 17. A hollow column or bearing 18 projects upwardly from said base at, for instance, the center thereof and a pedestal 19 also projects upwardly from the base at a suitable location which will be apparent from the following description.

The hollow column 18 houses a ball 20 on which rests the lower closed and convex or rounded end of the hollow or chambered shaft 21. Said hollow shaft 21 projects a suitable distance above the column 18 and has a gear 22 fixed to its projecting end through the medium of a set screw 23 or equivalent placed in the hub 24 of said gear.

Figure 5:
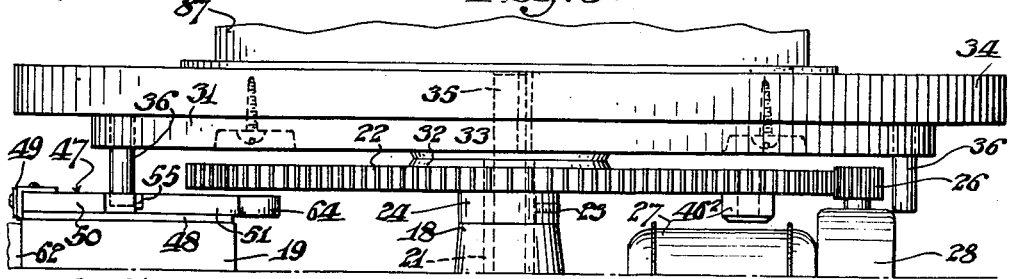
Fig. 5 is a fragmentary side elevation of another modification.

Meshing with gear 22 is a pinion 26 receiving its motion from a prime mover 27, such as an electric motor, through suitable mechanism, such as a speed reducer 28 of any well known construction and therefore only the casing is illustrated in Figs. 1, 2 and 5. Where a number of units are used together the pinions of the several units are driven from a common shaft 29 and suitable gears 30, as shown in Fig. 7, which are the equivalent of the speed reducer.

A plate 31 is superimposed on the gear 22 so as to revolve therewith, due to friction, except when acted upon by an outside agency to arrest the motion of said plate. Preferably the gear has a friction pad 32 or projection which may be an integral part thereof and this pad coacts with a similar pad 33 on the plate 31. To said plate 31 is fastened a disc 34 so that the two become a unitary structure and constitute a turntable. This turntable is fixed to a spindle 35 that is journalled in the hollow shaft 21. Such an arrangement provides a long or extended bearing surface for the spindle and therefore gives stability to the turntable to prevent its wobbling or tipping. The turntable, or particularly the plate 31, carries depending spaced studs 36.

The elements so far described are common to all forms or variations of the invention.

Referring particularly to Figs. 1 to 4 inclusive, a trigger 37 constituting a lock, is suitably pivoted on top of the pedestal 19 and has a notch 38 to successively receive the studs 36 carried by the driven member or plate 31 for temporarily arresting the travel of said driven member. The lock is urged into the path of travel of the studs 36 by a spring 39 having one end anchored to the pedestal 19, as at 40, and the other end selectively engaged in one of the holes 41 in the lock whereby the tension of the spring may be varied. The travel of the lock is regulated by a pin 42 depending from said lock and projecting into a hole 43 in the top of the pedestal, said hole 43 being of larger diameter than the pin 42. When desirable, the lock may be held in a retracted position out of the path of travel of said studs 36 by a catch 44 pivoted at one end to the back of the lock so that the catch can be swung down behind the pedestal 19. With the lock in a retracted position, the driven member or turntable, comprising the plate 31 and disc 34, will be continuously revolved with the driving member or gear 21.

As illustrated in Figs. 1 and 2 the lock is provided with a pusher 45 in the form of a fin to be acted upon by a kicker 46, herein shown as a roller on a trunnion, carried by the driving member or gear 22 to temporarily retract the lock and release whatever stud 36 which may be held by the lock.

Figure 4:
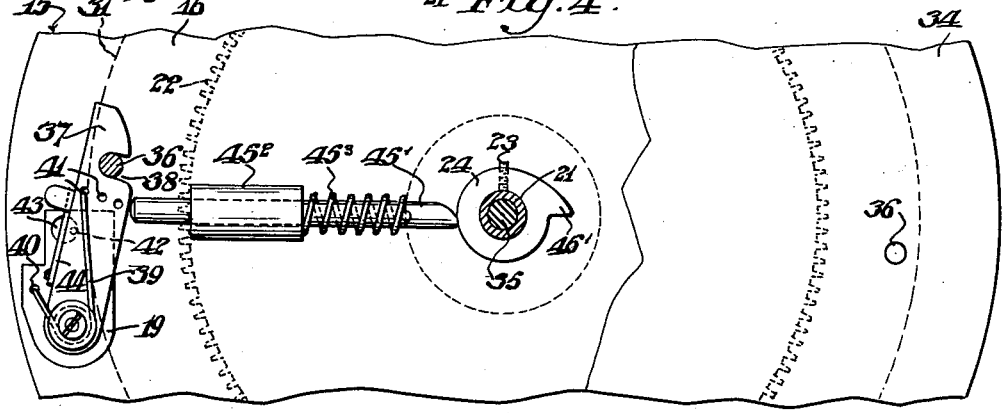
Fig. 4 is a plan view of Fig. 3 with portions broken away to show details of construction.

An equivalent of the above referred to pusher and kicker is illustrated in Figs. 3 and 4, wherein the pusher $45^1$ is in the form of a rod longitudinally slidable in a standard $45^2$ that may be carried by the base and normally urged inward by a spring $45^3$. The outer end of said pusher $45^1$ coacts with the lock 36 and the inner end is acted upon by a kicker $46^1$ in the form of a cam. Of course it should be obvious that the cam or kicker can be a separate element fixed to the hub 24, the gear or the shaft 21 or integral with hub or gear, so long as all the parts revolve in unison.

Reference will now be had generally to Figs. 5 to 14 inclusive wherein the lock 47 includes a frame or case 48 provided with a rear wall 49 and parallel ribs 50, 51 and 52, the latter forming longitudinal channels 53 and 54 between them. Also crosswise of at least two ribs, as 51 and 52, are formed slots 55 and 56. In the channel 53 is slidably mounted a slide bolt 57 having a beveled nose and a shank projecting through the rear wall 49, said shank having a head on the outer end which may consist of a screw and washer or other equivalent. The slide bolt 57 is normally urged inward by a spring 58 about the shank and engaging the rear wall 49 and a suitable part of the slide bolt.

In the channel 54 is slidably mounted a secondary bolt 59 provided with a shank projecting through the rear wall 49 and said shank has a head on the outer end which, like the first mentioned one, may consist of a screw and washer or other equivalent. The secondary slide bolt is also normally urged inward by a spring 60 about the shank of said secondary slide bolt 59 and engaging the rear wall 49 and an appropriate part of the secondary slide bolt. This secondary slide bolt 59 has a transverse or cross passageway 61 formed in the top thereof intermediate its ends which passageway is normally out of line with or in staggered relation to the slots 55 and 56 but which is moved into alignment with said slots as the secondary slide bolt is retracted.

To retain both slide bolts retracted, when desired, a catch 62, Fig. 13, is pivoted, as at 63, in any suitable location so that the free end may swing into position between the rear wall 49 of the lock frame and the heads on the shanks of the slide bolts.

Figure 6:
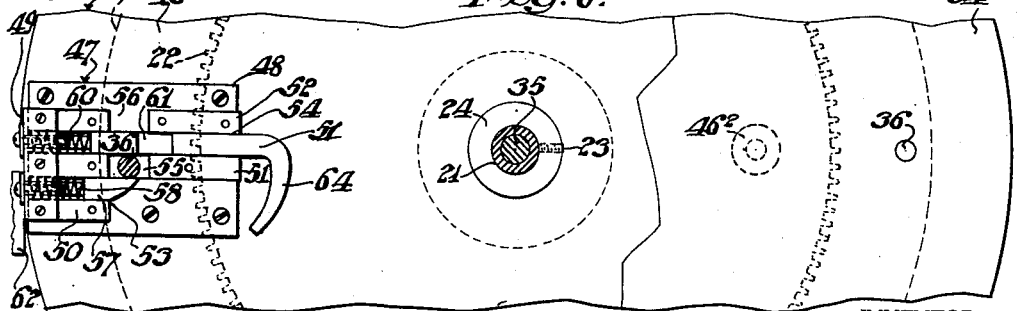
Fig. 6 is a plan view of Fig. 5 with portions broken away to illustrate certain details of construction.

As illustrated particularly in Figs. 5 and 6 and incidentally in Figs. 9 to 12 inclusive, the secondary slide bolt 59 has a pusher element 64 consisting of a finger, forming an acute angle with the body of said secondary slide bolt 59, to be engaged by the kicker $46^2$ carried by the gear 22 or driving member. The kicker in this instance is the same as the one illustrated in Figs. 1 and 2. In the modification shown in Fig. 14, the pusher $64^1$ is merely an elongation or extension of the secondary sliding bolt 59 and projects a sufficient distance to position the free or inner end in the path of travel of the kicker $46^3$ which is a cam similar to that depicted in Figs. 3 and 4.

According to the arrangement of parts shown in Figs. 5, 6 and 14 as the driven member or plate 31, moves with the driving member or gear 22, due to friction caused by the weight of the driven member resting upon the driving member, a stud 36 will engage the beveled nose of the sliding bolt 57 and force the latter to a retracted position and permit the stud to enter the slot 55 and engage the secondary sliding bolt 59, at which time the sliding bolt 57 will return to its normal position due to the action of its spring. The stud is now firmly held in the lock and the driven member is prevented from rotating but the driving member continues to revolve. At a predetermined time, according to whether one or more kickers are used, a kicker, either $46^2$ or $46^3$, will contact its respective pusher of the lock and retract the secondary sliding bolt 59 to align the passageway 61 with the slots 55 and 56 as shown in Fig. 12. As soon as the passageway aligns with the slots the stud is free to pass out of the lock through said passageway and the slot 56 wherefore the driven member will be carried around by the driving member by frictional contact until the same or another stud enters the lock to temporarily arrest further progress of the driven member. These operations are repeated so long as the driving member revolves and provides an intermittent movement of the driven member.

The electro-mechanical apparatus is particularly illustrated in Figs. 7 to 13 inclusive wherein a small motor 65 is shown mounted on the pedestal 19 by means of posts 66. On the motor shaft 67 is a pinion 68 meshing with a gear 69 having a pinion 70 revolving in unison therewith which pinion 70 meshes with a gear 71 which in turn meshes with a rack 72 attached to the secondary slide bolt 59 by suitable fastening means 73, such as screws, projecting through apertures in the base of the lock frame 48. The apertures must be large or long enough to permit the necessary movements of the secondary slide bolt. The train of gears between the motor 65 and the rack 72 is to be regulated according to the speed of the motor used and the speed at which the secondary slide bolt is to be actuated.

While it is obvious that one or any other number of the units may be used, for convenience of describing the operation of the electro-mechanical apparatus there are three of the units shown in Fig. 7. The motor 65 of each unit has one side or pole connected by a conductor 73 with a separate stationary terminal contact 74 on an element 75 of the make and break timer. A revolving element 76 of the timer has a single contact 77, preferably spring pressed outwardly, which successively temporarily engages the contact or contacts 74 and said contact 77 is electrically connected with a collector ring 78 also on the revolving element 76. Constantly engaging the collector ring is a brush 79 carried by another stationary element 80 of the timer and to said brush leads a conductor 81 from one of the line wires, as 82. The opposite pole of each motor 65 is connected by a conductor 83 with the other one of the line wires, as 84. The revolving element of the timer is actuated by a motor 85 through a speed reducer 86 and said motor, as well as the motor 27, is electrically connected with the line wires. It might be well to state at this time that the motor 85 can be eliminated and the power derived from the motor 27 used to drive the revolving element 76 of the timer.

As a stud 36 on the driven member reaches the lock said stud moves the sliding bolt 57 back and enters the lock where said stud is temporarily held, thus arresting the motion of the driven member. At a predetermined time, the contact 77 on the revolving element of the timer engages a terminal contact 74 thus causing electrical current to flow through the lock motor 65 connected with the respective contact 74. When the motor 65 is energized it will operate the associated train of gears to retract the secondary sliding bolt 59 and thereby release the stud and permit the driven member to travel with the driving member.

The articles to be displayed may be the goods of merchants or merely something to attract attention of possible customers so that they may scrutinize merchandise located in the vicinity of display device. For convenience of illustration I have shown the displayed articles as panels 87 which may have several subject matters or parts of a subject matter delineated on a number of the panels to be successively moved to a position to be viewed by the onlookers.

By reference to Fig. 7 it will be apparent that different combinations of words, sentences and the like can be utilized where a number of the display device units are associated and the complete subject matter will not be disclosed until the last of the panels has been turned to the front of the machine.

While I have shown all of the locks as working from the outside inward to engage the studs of the driven member, it will be readily recognized that said locks can be reversed so as to travel in an outward direction for engaging said studs without changing the principle of the disclosure. Likewise, I believe it to be apparent that pulleys and belts can be substituted as equivalents for the gears 22 and 26.

Of course I do not wish to be limited to the exact details of construction herein shown and described, as these may be varied within the scope of the appended claims without departing from the spirit of my invention.

Having thus described my invention, what I claim as new and useful is:

1. In a display device, a frame, a hollow shaft journalled in said frame, a driving member fixed to said shaft, means to continuously revolve said driving member, a spindle journalled in the hollow shaft, a driven member fixed to said spindle and frictionally engaging the driving member, lock engaging means carried by the driven member, a lock in the path of travel of said lock engaging means to clutch the latter and thereby hold the driven member stationary, and means to actuate the lock at preselected periods to release the lock engaging means which is in the lock whereby the driven member may move with the driving member.

2. The structure in claim 1 wherein the lock actuating means is carried by the driving member.

3. In a display device, a frame, a hollow shaft journalled in said frame, a continuously revolving driving member fixed to said shaft, a spindle in said shaft, a driven member fixed to said spindle and frictionally engaging the driving member, lock engaging means carried by the driven member, a spring operated lock to clutch the lock engaging means whereby the driven member will be temporarily held stationary, and means to actuate the lock at preselected periods to release the clutched lock engaging means whereby the driven member may temporarily revolve with the driving member due to their frictional engagement.

4. The structure in claim 3 wherein the lock actuating means comprises a kicker moved by and with the driving member, and a pusher between the lock and said kicker.

5. In a display device, a frame including a hollow bearing column and a pedestal, a ball in the bottom of said hollow bearing column, a hollow shaft having a rounded closed lower end projected into said bearing column and resting on the ball, a driving member fixed to the upper end of said hollow shaft, a spindle located in the hollow shaft and projecting above the driving member, a driven member fixed on said spindle and frictionally engaging the driving member with the lower end of the spindle short of the bottom of the hollow shaft, lock engaging means carried by said driven member, a spring operated lock mounted on the pedestal in the path of travel of said lock engaging means to clutch the latter for temporarily holding the driven member stationary, means to actuate the lock at preselected periods to release the clutched lock engaging means whereby the driven member may temporarily revolve with the driving member, and means to revolve said driving member.

6. The structure in claim 5 in combination with means to hold the clutching element of the lock in a retracted position.

7. In a display device, a frame including a hollow bearing column and a pedestal, a ball in the bottom of said hollow bearing column, a hollow shaft having a rounded closed lower end projected into said bearing column and resting on the ball, a driving member fixed to the upper end of said hollow shaft, a spindle located in the hollow shaft and projecting above the driving member, a driven member fixed on said spindle and frictionally engaging the driving member with the lower end of the spindle short of the bottom of the hollow shaft, lock engaging means carried by said driven member, a lock comprising a notched trigger pivoted on the pedestal, a spring adjustable for tension and urging the lock into the path of travel of said lock engaging means so that the latter enters the notch whereby the driven member is temporarily held stationary, means to limit the movements of the lock, a kicker carried by the driving member, a pusher to be acted upon by the kicker to actuate the lock at preselected periods to release the clutched lock engaging means whereby the driven member may temporarily revolve with the driving member, and means to revolve the driving member.

8. The structure in claim 7 wherein the pusher is a part of the lock.

9. The structure in claim 7 wherein the pusher is a separate member located between the lock and kicker.

10. The structure in claim 7 wherein coacting friction pads are carried by the driving and driven members.

11. In a display device, a frame, a hollow shaft journalled in said frame, a driving member fixed to said shaft, means to revolve said driving member, a spindle in said shaft, a driven member fixed to said spindle and frictionally engaging the driving member, lock engaging means carried by the driven member, a lock including a casing having a rear wall, parallel spaced ribs on the casing forming channels and at least two adjacent ribs having cross slots, a sliding bolt having a beveled nose and mounted in the forward slot relative to the direction of travel of the driving and driven members to be pushed back by the lock engaging means so that the latter may enter the slot in one of the ribs, a spring to urge said sliding bolt forward, a secondary sliding bolt having a cross passageway and mounted in the other channel, a spring urging the secondary sliding bolt forward to normally retain the cross passageway out of alignment with the slots so that the secondary sliding bolt will arrest the passage of the lock engaging means whereby the driven member will be temporarily held stationary, a pusher associated with the lock, and means to strike the pusher at preselected periods to actuate the secondary sliding bolt and release the lock engaging means whereby the driven member may revolve with the driving member.

12. In a display device, a frame, a hollow shaft journalled in said frame, a driving member fixed to said shaft, means to revolve said driving member, a spindle in said shaft, a driven member fixed to said spindle and frictionally engaging the driving member, lock engaging means carried by the driven member, a lock including a casing having a rear wall, parallel spaced ribs on the casing forming channels and at least two adjacent ribs having cross slots, a sliding bolt having a beveled nose and mounted in the forward slot relative to the direction of travel of the driving and driven members to be pushed back by the lock engaging means so the latter may enter the slot in one of the ribs, a spring to urge said sliding bolt forward, a secondary sliding bolt having a cross passageway and mounted in the other channel, a spring urging the secondary sliding bolt forward to normally retain the cross passageway out of alignment with the slots so that the secondary sliding bolt will arrest the passage of the lock engaging means whereby the driven member will be temporarily held stationary, a rack fixed to the secondary sliding bolt, a motor, a train of gears between said motor and rack, an electrical make and break timer, a circuit including said timer and said motor for energizing the motor at preselected periods to actuate the secondary sliding bolt and release the lock engaging means whereby the driven member may revolve with the driving member.

ALOIS F. STEIERT.